United States Patent [19]

Madson

[11] 4,345,490

[45] Aug. 24, 1982

[54] MULTI-SPEED POWERSHIFT TRANSMISSION

[75] Inventor: Lyle R. Madson, Cedar Falls, Iowa

[73] Assignee: Deere & Company, Moline, Ill.

[21] Appl. No.: 134,274

[22] Filed: Mar. 26, 1980

[51] Int. Cl.³ .............................................. F16H 57/10
[52] U.S. Cl. ...................................... 74/761; 74/760; 74/767; 74/768; 74/769
[58] Field of Search ................. 74/758, 759, 760, 761, 74/762, 763, 767, 768, 769, 766

[56] References Cited

U.S. PATENT DOCUMENTS

| | | | |
|---|---|---|---|
| 2,220,174 | 11/1940 | Ravigneaux | 74/760 X |
| 2,546,378 | 3/1951 | Winther | 74/761 X |
| 2,821,869 | 2/1958 | Kelbel | 74/763 |
| 2,844,975 | 7/1958 | Kelbel et al. | 74/761 X |
| 2,868,037 | 1/1959 | Hindmarch | 74/768 X |
| 3,274,858 | 9/1966 | Meyer et al. | 74/761 |
| 3,298,252 | 1/1967 | Harris et al. | 74/761 |
| 3,823,622 | 7/1974 | Mori et al. | 74/759 |
| 3,877,320 | 4/1975 | Iijima | 74/763 X |
| 3,971,268 | 7/1976 | Murakami et al. | 74/759 |
| 4,089,238 | 5/1978 | Forster et al. | 74/763 X |

FOREIGN PATENT DOCUMENTS

| | | | |
|---|---|---|---|
| 541388 | 5/1957 | Canada | 74/759 |
| 2141563 | 2/1973 | Fed. Rep. of Germany | 74/759 |
| 2065397 | 8/1973 | Fed. Rep. of Germany | 74/759 |
| 2447581 | 4/1976 | Fed. Rep. of Germany | 74/759 |
| 2521832 | 11/1977 | Fed. Rep. of Germany | 74/759 |
| 2751312 | 6/1978 | Fed. Rep. of Germany | 74/759 |
| 52-44371 | 7/1977 | Japan | 74/759 |
| 52-18570 | 12/1977 | Japan | 74/758 |
| 52-3974 | 12/1977 | Japan | 74/765 |

Primary Examiner—Leslie Braun

[57] ABSTRACT

This invention relates to a multi-speed powershift transmission which is particularly useful in agricultural and industrial type vehicles. The transmission comprises three main planetary sections and two drive clutches. In addition to the two drive clutches, the three planetary sections also contain additional clutches and brakes which act in combination to provide a wide range of closely spaced speed increments.

13 Claims, 5 Drawing Figures

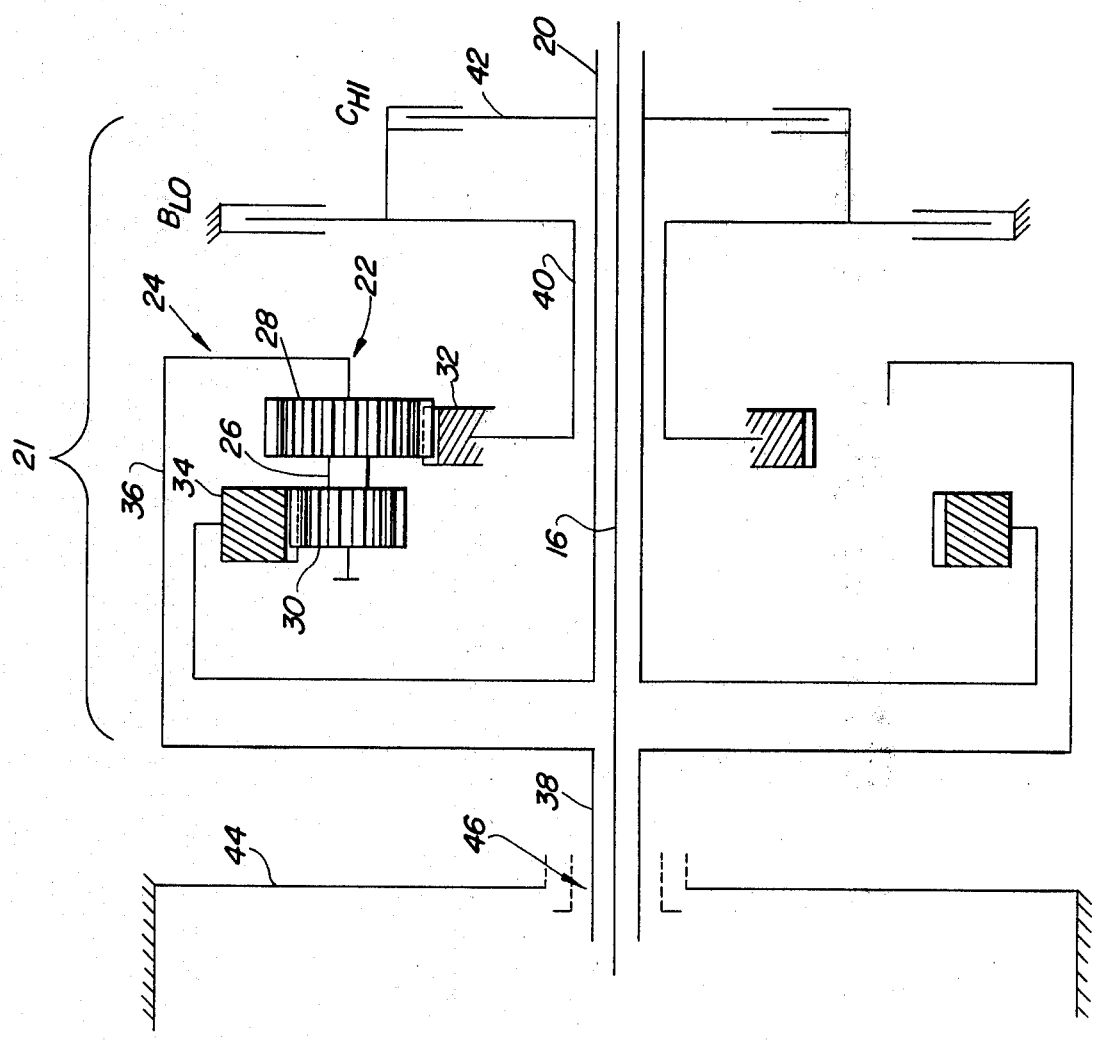

| TRANMISSION ELEMENTS ENGAGED | | | | | | | | | |
|---|---|---|---|---|---|---|---|---|---|
| GEAR | $C_1$ | $C_2$ | $C_{LO}$ | $B_{HI}$ | $B_1$ | $B_2$ | $B_3$ | $B_4$ | $C_3$ |
| 1 | X | | | X | X | | | | X |
| 2 | X | | | X | | X | | | X |
| 3 | X | | X | | X | | | X | |
| 4 | | X | X | | X | | | | X |
| 5 | X | | | | | X | | X | |
| 6 | | X | | X | X | | | | X |
| 7 | | X | X | | | X | | | X |
| 8 | | X | | X | | X | | | X |
| 9 | | X | X | | X | | | X | |
| 10 | | X | | X | X | | | X | |
| 11 | X | | X | X | | | X | | |
| 12 | | X | X | | | X | | X | |
| 13 | | X | | X | | X | | X | |
| 14 | X | X | X | | | | | | X |
| 15 | X | X | | X | | | | | X |
| 16 | X | X | X | | | | | X | |
| 17 | X | X | | X | | | | X | |
| R1 | X | | X | | X | | X | | |
| R2 | X | | X | | | X | X | | |
| R3 | | X | X | | X | | X | | |
| R4 | | X | | X | X | | X | | |
| R5 | X | | X | X | | | | | X |
| R6 | | X | X | | | X | X | | |
| R7 | | X | | X | | X | X | | |
| R8 | X | | X | X | | | | X | |
| R9 | X | X | X | | | | | X | |
| R10 | X | X | | X | | | | X | |

FIG. 5

MULTI-SPEED POWERSHIFT TRANSMISSION

BACKGROUND OF THE INVENTION

1. Field of the Invention

This invention relates to a multi-speed powershift transmission and more particularly, to a multi-speed powershift transmission for use in an agricultural or industrial type tractor.

1. Description of the Prior Art

History has shown that vehicles of the agricultural and/or industrial type require a wide range of closely spaced speed increments in order to satisfy a variety of working conditions. Such vehicles normally utilize governed engines which provide a relatively constant engine speed but which necessitate numerous gear shifting in order to get the different gear ratios and the correct ground speed. This upshifting and downshifting presents a problem in that the operator must shift without an appreciable disconnection between the driving torque and the load. For example, in plowing with a tractor, a temporary increase in load can be overcome by downshifting from say seventh to sixth, but if the shift interval is too long, the tractor will lose momentum and a further downshift is required.

The shifting interval problem has been primarily corrected by the use of a powershift transmission which enables an operator to shift gears under full power without clutching. Such transmissions are described in U.S. Pat. No. 3,274,858 issued in 1966 to Meyer et al and U.S. Pat. No. 3,298,252 issued in 1967 to Harris et al. However, most powershift transmissions provide only a limited number of speeds. Therefore, there is a need to provide a transmission with a wide range of closely spaced speed increments which an operator needs for use in various tillage and planting operations. Furthermore, some powershift transmissions cannot provide a good speed selection in all of the needed speed ranges, such as several slow speeds, a range of closer field working speeds and several higher speeds applicable to transport conditions. Now, a multi-speed powershift transmission has been invented which will overcome the deficiencies of the prior art.

The general object of this invention is to provide a multispeed powershift transmission which offers a greater selection of desirable working speeds. A more specific object of this invention is to provide a multi-speed powershift transmission for use in an agricultural or industrial type tractor.

Another object of this invention is to provide a greater number of closely spaced speeds so an operator can utilize the most advantageous speed to optimize productivity.

A further object of this invention is to provide more closely spaced gear speeds within the field working range.

Still further, an object of this invention is to provide a lower gear speed than is normally found in conventional 8-speed powershift transmissions.

Other objects and advantages of this invention will become apparent to one skilled in the art based upon the ensuing description.

SUMMARY OF THE INVENTION

Briefly, the objects of this invention can be realized by using the herein described multi-speed powershift transmission in a tractor type vehicle. The multi-speed powershift transmission comprises a clutch drum for connecting the drive shaft of an engine to the transmission. The clutch drum houses two clutches which are separately or jointly engageable to transfer power to a first input shaft and/or a first plantary section which drives a second input shaft. This first planetary section comprises planetary gearing, a clutch and a brake which are selectively engageable to act on the second input shaft in combination with the second clutch in the clutch drum. Positioned downstream of the first planetary section is a second planetary section which transmits the power from the two input shafts to an intermediate drive member or carrier. The second planetary section contains planetary gearing and two brakes which are selectively engageable in combination with the aforementioned clutches and brake for imparting several different speeds to the carrier. The carrier, in turn, drives the gearing of a third planetary section. This third planetary section contains planetary gearing, an output shaft, a clutch and two brakes. The clutch and brakes are alternatively engageable for producing several different speeds in the output shaft. By selectively engaging various combinations of the clutches and brakes, the operator is able to obtain a wide range of closely spaced speed increments.

BRIEF DESCRIPTION OF THE DRAWINGS

FIG. 4 is a diagrammatical view of another embodiment for the first planetary section.

FIG. 5 is a table which shows the relationship among the various speeds and the clutch and brake units which are engageable to achieve those speeds.

DETAILED DESCRIPTION OF THE INVENTION

Figure 1:
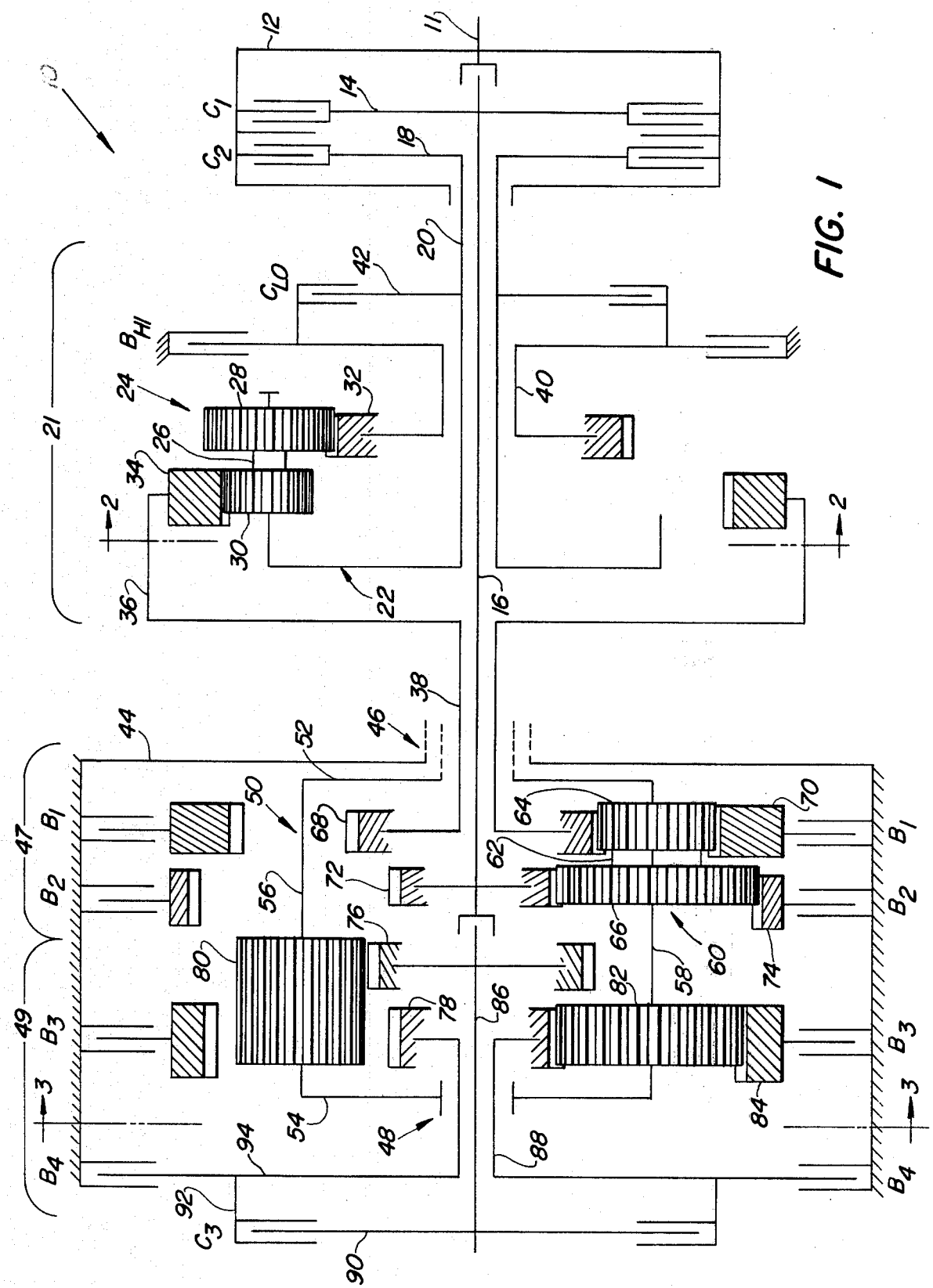
FIG. 1 is a diagrammatical view, partly in section, of one embodiment of the multi-speed powershift transmission.

FIG. 1 shows a multi-speed powershift transmission 10 which is connected to a driven power shaft 11. Typically, the driven power shaft 11 is a drive shaft extending out from an internal combustion engine. The driven power shaft 11 extends rearwardly into a clutch drum 12 which houses two clutches $C_1$ and $C_2$. The word "rearwardly" is used throughout this application to describe he disposition of the transmission 10 in a vehicle. However, it should be realized that this language is used only for purposes of convenience and not by way of limitation.

The clutch $C_1$ includes a driven clutch plate 14 which is mounted on a rearwardly extending shaft 16 while the clutch $C_2$ includes a driven clutch plate 18 which is mounted on a rearwardly extending shaft 20.

Figure 2:
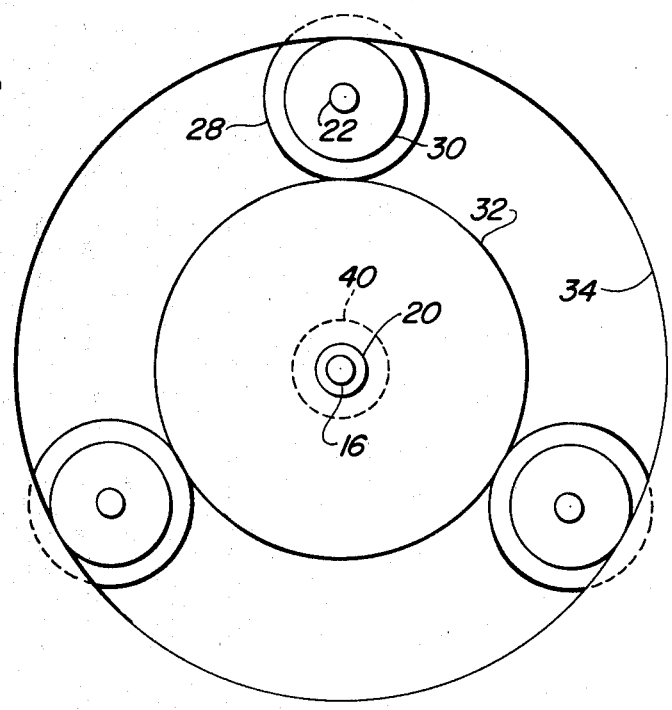
FIG. 2 is a schematic view as seen along the line 2—2 of FIG. 1.

To the rear of the clutch drum 12 is a first planetary section 21. This first planetary section 21 comprises a rotatable carrier 22 on which planet gear means 24 are rotatably mounted. The carrier 22 is normally splined or otherwise attached to the shaft 20 and will rotate in unison with it. As shown in FIG. 2, the planet gear means 24 is comprised of a plurality of cluster gears 26, preferably three cluster gears 26 arranged approximately 120° apart. Each cluster gear 26 is comprised of a first and a second, 28 and 30 respectively, coaxially connected pinion gear. The first and second pinion gears 28 and 30 are of unequal size, preferably with the first pinion gear 28 having the larger diameter. The first pinion gear 28 meshes with a rotatable sun gear 32 while the second pinion gear 30 meshes with a rotatable ring gear 34.

As shown in FIG. 1, the ring gear 34 is attached to connecting means 36 which is mounted on a hollow tubular member 38 while the sun gear 32 is attached to connecting means 40. The connecting means 40 connects the sun gear 32 to a brake $B_{Hi}$ and a clutch $C_{LO}$. The clutch $C_{LO}$ includes a driven clutch plate 42 which is mounted on the rearwardly extending shaft 20. The clutch $C_{LO}$ can be engaged to selectively lock the sun gear 32 to the carrier 22 and the brake $B_{Hi}$ can be applied to selectively Referring now to FIG. 4, an alternative embodiment for the first planetary section 21 is shown wherein the ring gear 34 is attached to the rearwardly extending shaft 20 while the connecting means 36 is joined to the rotatable carrier 22. This arrangement produces an underdrive situation between the driven power shaft 11 and the hollow tubular member 38 when the clutch $C_2$ and the brake $B_{LO}$ are engaged. In FIG. 4, the brake is designated $B_{LO}$ and the clutch is designated $C_{Hi}$ because direct drive is the highest speed obtainable and that occurs when the clutch $C_{Hi}$ is engaged.

In the arrangement depicted in FIG. 1, an overdrive situation is produced between the driven power shaft 11 and the hollow tubular member 38 when the clutch $C_2$ and brake $B_{Hi}$ are engaged. The word "underdrive", as used herein, means that the hollow tubular member 38 will rotate at a slower speed than the driven power shaft 11. The word overdrive means just the opposite. The particular gear ratios which can be produced above or below a 1:1 ratio, commonly referred to as direct drive, will depend upon the number of gear teeth on each gear, the size of the sun gear 32, the cluster gear 26 and the ring gear 34, and the arrangement of the gears to each other. Such information is known to those skilled in the art and further description thereof is deemed unnecessary.

Positioned rearward of the first planetary section 21 in FIG. 1 is a transmission housing 44 containing a front aperture 46 and a rear aperture 48. The front aperture 46 is the opening through which passes the rearwardly extending shaft 16 and the hollow tubular member 38. The housing 44 contains a secondary planetary section 47 and a rearwardly positioned third planetary section 49. The second and third planetary sections, 47 and 49 respectively, comprise the internal gearing used in 8-speed planetary transmissions, such as is shown and disclosed in U.S. Pat. No. 3,274,858 issued in 1966 to Meyer et al and U.S. Pat. No. 3,298,252 issued in 1967 to Harris et al. Both patents are herein incorporated by reference and made a part hereof.

The second planetary section 47 comprises a rotatable carrier 50 on which planet gear means 60 are rotatably mounted. The carrier 50 also known as an intermediate drive member, is coaxially apertured at 46 and 48. The carrier 50 contains a front wall 52 and a rear wall 54 which support a plurality of pinion shafts 56 and 58 on which several planet gear means are mounted. As depicted, each planet gear means 60 is mounted on a pinion shaft 58. Typically, the carrier 50 has three pinion shafts for each planet pinion set.

The planet gear means 60 comprises a plurality of cluster gears 62, preferably three cluster gears 62, arranged approximately 120° apart. Each cluster gear 62, or compound gear 62 as they are sometimes referred to, is comprised of first and second, 64 and 66 respectively, coaxially connected pinion gears. The first and second pinion gears, 64 and 66 are of unequal size, preferably with the second pinion gear 66 having the larger diameter. The first pinion gear 64 meshes both with a rotatable first sun gear 68 and a relatively rotatable first ring gear 70. The first sun gear 68 is splined or otherwise mounted to the hollow tubular member 38. The second pinion gear 66 meshes both with a rotatable second sun gear 72 and a relatively rotatable second ring gear 74. The second sun gear 72 is splined or otherwise mounted to the rearwardly extending shaft 16. This shaft 16 is axially aligned within the hollow tubular member 38 which is preferably a shaft. As shown, the second sun gear 72 is located rearward of the first sun gear 68. By engaging the clutch $C_1$, power can be transferred from the driven power shaft 11 through the rearwardly extending shaft 16 to the second sun gear 72.

The second planetary section 47 also includes first and second brakes, $B_1$ and $B_2$ respectively, which can be selectively applied to prevent rotation of the first and second ring gears 70 and 74. The grounded portion of the first and second brakes $B_1$ and $B_2$, is affixed to the housing 44. Other methods of grounding the brakes $B_1$ and $B_2$ can be used, if desired. These other methods are known to those skilled in the transmission art and therefore these alternative methods will not be explained herein.

Figure 3:
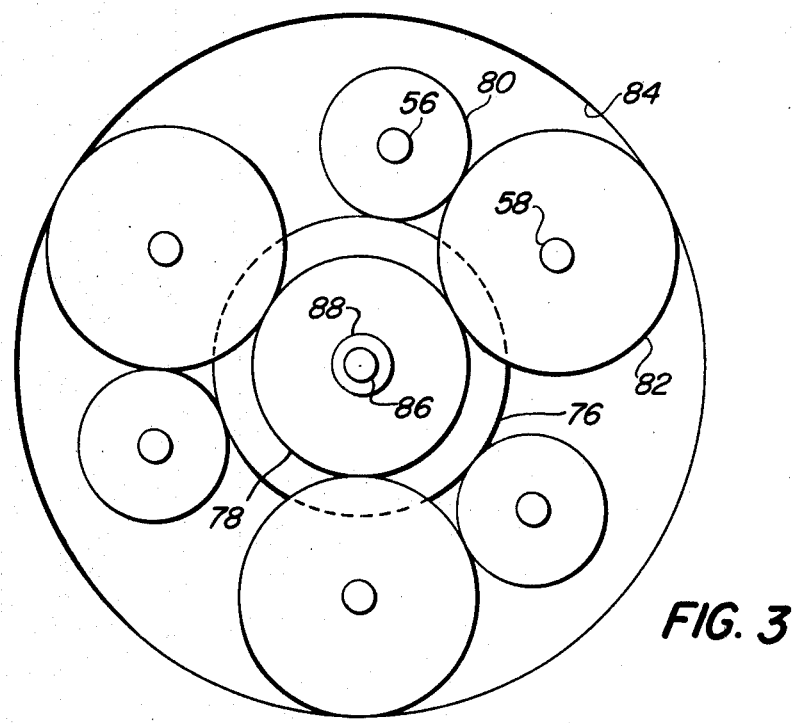
FIG. 3 is a schematic view as seen along the line 3—3 of FIG. 1.

Rearward of the second planetary section 47 is the third planetary section 49. The third planetary section 49 comprises an extension of the rotatable carrier 50 to which is mounted a Ravigneaux gear train. The Ravigneaux gear train comprises first and second sun gears, 76 and 78 respectively, first and second sets of planet gears, 80 and 82 respectively, a ring gear 84 and a brake $B_3$. Each set of planet gears, 80 and 82, preferably contain three planet gears positioned approximately 120° apart as shown in FIG. 3.

The first planet gears 80 are mounted on pinion shafts 56 and are wider in width than the second planet gears 82. The first planet gears 80 are situated just rearward of the second planetary section 47 and mesh with both the first sun gear 76 and with the second planet gears 82. The first sun gear 76 is mounted on a rotatable output member 86 which extends rearward through the aperture 48. This output member 86, preferably a shaft, provides the means for transmitting rotational motion out of the powershift transmission 10. The second planet gears 82 are situated just forward of the rear wall 54 of the carrier 50 and are mounted on pinion shafts 58. These second planet gears 82 mesh with both the second sun gear 78 and the ring gear 84. The second sun gear 78 is mounted on a rearwardly extending hollow shaft 88 which encircles the output member 86 while the ring gear 84 is in an encircling relationship with the carrier 50.

The brake $B_3$ is affixed to the housing 44 and can be applied to prevent rotation of the ring gear 84. The particular method of affixing the grounded portion of the brake $B_3$ to the housing 44 is not a critical feature and can be varied by those skilled in the art.

The third planetary section 49 also includes a clutch $C_3$ and another brake $B_4$. The clutch $C_3$ comprises a clutch plate 90 mounted to the output member 86 and a clutch drum 92 connected to a driven plate 94. This clutch $C_3$ is engageable to selectively lock the second sun gear 78 to the first sun gear 76. The brake $B_4$ is operatively associated with the driven plate 94 and can be selectively applied to prevent rotation of the second sun gear 78.

The arrangement of the gearing in this multi-speed powershift transmission 10, together with the available clutching and braking characteristics, provide a total possibility of twenty-seven different speeds. These twenty-seven different speeds include seventeen forward speeds and ten reverse speeds. The twenty-seven possible gear speeds are produced by driving the carrier 50 at eight different gear ratios. These eight different gear ratios are then increased threefold by the alternate action of the clutch $C_3$, the brake $B_3$ and the brake $B_4$. In addition, three more speeds are possible by engaging both of the clutches $C_1$ and $C_{LO}$ and the brake $B_{Hi}$ in combination with either the clutch $C_3$, the brake $B_3$ or the brake $B_4$. By engaging both of the clutches $C_1$ and $C_{LO}$ and the brake $B_{Hi}$, the first sun gear 68 is held stationary while the second sun gear 72 is rotating at the speed of the driven power shaft 11. This action causes the carrier 50 via the rotation of the cluster gears 62 to rotate in a reverse direction relative to the driven power shaft 11.

It should be evident that some of the gear ratios will be too closely spaced or impractical for everyday use. Because of this, only fifteen forward speeds and four reverse speeds are actually used in the preferred embodiment. The remaining speeds are still available and can be utilized, if desired. The gear speeds which are actually being used in the preferred embodiment are distinguished and explained below under the subheading "Operation".

All of the above-mentioned clutches and brakes are engageable by conventional hydraulic actuators well known to those skilled in the transmission art. Such actuators, as well as the controls, therefore do not form a part of the present invention and therefore will not be described.

Operation

FIG. 5 shows a table listing the various clutches and brakes which are engageable for obtaining the different gear speeds available from the multi-speed powershift transmission 10 of this invention. One exception should be noted, however. Whenever power is transmitted through the clutch $C_1$, as opposed to through the clutch $C_2$ or a combination of the clutches $C_1$ and $C_2$, one or the other of either clutch $C_{LO}$ or brake $B_{Hi}$ should be engaged. This engagement will prevent possible damage to the gearing of the first planetary section 21 due to overspeeding which could be caused by feedback through the first sun gear 68 of the second planetary section 47 via hollow member 38, connecting means 36 and ring gear 34. Since the engagement of either the clutch $C_{LO}$ or the brake $B_{Hi}$ has no effect on power flow or speed reduction when the clutch $C_1$ is engaged and the clutch $C_2$ is disengaged, the engagement of the clutch $C_{LO}$ or the brake $B_{Hi}$ as they appear in FIG. 5 can be switched. However, a substitution of $C_{LO}$ for $B_{Hi}$ or vice versa may necessitate an alternation of the control system.

In the first forward gear, the clutches and brake, $C_1$, $B_1$ and $C_3$ are engaged. The engagement of the clutch $C_1$ causes the second sun gear 72 mounted on the shaft 16 to rotate at the same speed as the driven power shaft 11. This rotation, in turn, causes rotation of the cluster gears 62 through the action of the planet gears 66. The engagement of the brake $B_1$ will cause the first ring gear 70 to be held stationary and therefore serve as a reaction element for the cluster gears 62 through the planet gears 64. With the ring gear 70 held stationary, the cluster gears 62 will roll around the ring gear 70 causing rotation of the carrier 50 at a first reduced speed relative to the speed of the driven power shaft 11. Now with the clutch $C_3$ engaged, the second sun gear 78 of the third planetary section 49 is locked to the first sun gear 76 of the third planetary section 49. This effectively locks the carrier 50 to the output member 86 and insures that the output member 86 is driven at the same first reduced speed as the carrier 50.

In the second forward gear, the clutches and brake $C_1$, $B_2$ and $C_3$ are engaged. The only difference between the first gear and the second gear is the engagement of the brake $B_2$ instead of the brake $B_1$. With the brake $B_2$ engaged, the second ring gear 74 will be held stationary so as to act as a reaction member, via the cluster gears 62, on the carrier 50. This will cause the carrier 50 to be driven at a second reduced speed which is higher than the first speed. Just like in first gear, the engagement of the clutch $C_3$ will cause the output member 86 to be locked to the carrier 50 so that the output member 86 is turning at the second reduced speed.

In the third forward gear, the clutch and brakes $C_1$, $B_1$ and $B_4$ are engaged. With the clutch $C_1$ and the brake $B_1$ engaged, the carrier 50 will again be driven at the first reduced speed relative to the driven power shaft 11. The brake $B_4$ will hold stationary the second sun gear 78 of the third planetary section 49. This action forces the second planet gears 82, due to their orbit about the second sun gear 78, to rotate. This rotation causes the first planet gears 80 of the third planetary section 49 to rotate. This rotation is transferred to the first sun gear 76 which will also rotate. Since the first sun gear 76 is mounted on the output member 86, the output member 86, due to the gear ratios, will rotate at a faster speed than that of the carrier 50. This faster speed is equivalent to a third reduced speed which is higher than the second reduced speed.

In the fourth forward gear, the clutches and brake $C_2$, $C_{LO}$, $B_1$ and $C_3$ are engaged. The engagement of the clutch $C_2$ causes the shaft 20, and hence the carrier 22, to be rotated at the same speed as the driven power shaft 11. By engaging the clutch $C_{LO}$, the sun gear 32 of the first planetary section 21 will be driven at the same speed as the shaft 20. This means that the planetary gear means 24 are locked so that the ring gear 34 is driven at the same speed as the driven power shaft 11. The ring gear 34, in turn, drives the first sun gear 68 of the second planetary section 47 via the hollow tubular member 38. With the brake $B_1$ engaged, the first ring gear 70 will be held stationary and serve as a reaction element for the cluster gears 62 through the planet gears 64. This causes the cluster gears 62 to roll around the first ring gear 70 thereby rotating the carrier 50 at a fourth reduced speed which is higher than the third reduced speed. The engagement of the clutch $C_3$ will control the reaction of the third planetary section 49 as described above for the first forward gear. That is, the third planetary section 49 is locked so that the output member 86 is driven at the same speed as the carrier 50 or at a fourth reduced speed.

The clutch and brake engagements for the fifth through thirteenth forward gears are depicted in FIG. 5. The corresponding relationship between the driven power shaft 11 and the output member 86 should be apparent in view of the above explanation for speeds one through four. Therefore, for brevity sake only and not by way of a limitation, a detailed explanation for each of these gear speeds will be omitted.

Of the gear speeds five through thirteen, the fifth and eleventh gear are not used in the preferred embodiment. The reasons for such non-use of certain gear speeds has been explained in the section entitled "Detailed Description of the Invention".

In the fourteenth forward gear, the clutches $C_1$, $C_2$, $C_{LO}$ and $C_3$ are engaged. The engagement of the clutches $C_1$ and $C_2$ causes the two shafts 16 and 20 to rotate at the same speed as the driven power shaft 11. This causes the carrier 22 of the first planetary section 21 to rotate at the same speed as the driven power shaft 11. By engaging the clutch $C_{LO}$, the sun gear 32 of the first planetary section 21 will be driven at the same speed as driven power shaft 11 thereby causing the hollow tubular member 38, via the ring gear 34 and the connecting means 36, to rotate at the same speed. The first and second sun gears, 68 and 72 respectively, of the second planetary section 47 will be driven at an equal speed and in turn cause the carrier 50 to rotate accordingly. The engagement of the clutch $C_3$ will lock up the third planetary section 49 so that the output member 86 is driven at the same speed as the carrier 50. In this case, the output shaft 86 will be driven at a 1:1 gear ratio in respect to the driven power shaft 11.

In the fifteenth forward gear, the clutches and brake $C_1$, $C_2$, $B_{Hi}$ and $C_3$ are engaged. The engagement of the clutches $C_1$ and $C_2$ will cause the two shafts 16 and 20 to rotate at the same speed as the driven power shaft 11. This causes the carrier 22 of the first planetary section 21 to rotate at the same speed as the driven power shaft 11. By engaging the brake $B_{Hi}$, the sun gear 32 of the first planetary section 21 will be held stationary while the carrier 22 rotates. This causes the hollow tubular member 38, via the ring gear 34 and the connecting member 36, to be driven at a speed faster than the driven power shaft 11. Therefore, in the second planetary section 47, the first sun gear 68 will rotate faster than the second sun gear 72 and in turn cause the carrier 50 to rotate faster than the driven power shaft 11. The engagement of the clutch $C_3$ will lock up the third planetary section 49 so that the output member 86 is driven at the same speed as the carrier 50. In this case, the output member 86 will be driven at a faster speed than the driven power shaft 11.

The clutch and brake engagements for the sixteenth and seventeenth forward gears are dpicted in FIG. 5. The corresponding relationship should be apparent from the preceeding explanation and therefore a detailed explanation will be omitted.

In the first reverse gear, the clutches and brake $C_1$, $B_1$ and $B_3$ are engaged. The engagement of the clutch $C_1$ causes the second sun gear 72 mounted on the shaft 16 to rotate at the same speed as the driven power shaft 11. This rotation in turn causes rotation of the cluster gears 62 through the action of the planet gears 66. The engagement of the brake $B_1$ will cause the first ring gear 70 to be held stationary and therefore serve as a reaction element for the cluster gears 62 through the planet gears 64. With the ring gear 70 held stationary, the cluster gears 62 will roll around the ring gear 70 causing rotation of the carrier 50 at a first reduced speed relative to the speed of the driven power shaft 11. The engagement of the brake $B_3$ causes the ring gear 84 of the third planetary section 49 to be held stationary. This action causes the second planet gears 82 to rotate in an opposite direction to the first planet gears 80. Therefore, the first planet gears 80 are rotating in the same direction as the carrier 50. The intermeshing of the first planet gears 80 on the first sun gear 76 of the third planetary section 49, cause the first sun gear 76 to turn in an opposite direction from the carrier 50. Accordingly, the output member 86 is driven in a reverse direction from that of the driven power shaft 11.

The clutch and brake engagements for the second through tenth reverse gears are depicted in FIG. 5. The corresponding relationship should be apparent for all the gears except fifth and eighth. In each of these two reverse gears, the clutches and brake $C_1$, $C_{LO}$ and $B_{Hi}$ are engaged together with either clutch $C_3$ or brake $B_4$. By engaging $C_1$, $C_{LO}$ and $B_{Hi}$, the first sun gear 68 of the second planetary section 47 is held stationary while the second sun gear 72 is driven at the same speed as the driven power shaft 11. The second planet gears 66 will orbit the second sun gear 72 but in an opposite direction due to the reaction exerted by the first planet gears 64 meshing with the stationary sun gear 68. Therefore, the carrier 50 will rotate in a reverse direction from that of the driven power shaft 11. The engagement of either the clutch $C_3$ or the brake $B_4$ is as explained above but neither affects the rotational direction of the output member 86.

The fourth, fifth, sixth, eighth, ninth and tenth reverse gear speeds are not utilized in the preferred embodiment.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications and variations which fall within the spirit and scope of the appended claims.

I claim:

1. A multi-speed powershift transmission for connection to a driven power shaft, said transmission comprising:
    (a) a first planetary section comprising a rotatable carrier, planet gear means rotatably mounted on said rotatable carrier, a rotatable sun gear meshing with said planet gear means, a rotatable ring gear meshing with said planet gear means, a rotatable hollow member, connecting means joining one of said sun gear, ring gear and carrier to said hollow member, a brake for selectively preventing rotation of a second of said sun gear, ring gear and carrier, and a clutch for selectively locking the second of said sun gear, ring gear and carrier to the third thereof;
    (b) a first drive clutch for selectively connecting the third of said sun gear, ring gear and carrier to said driven power shaft;
    (c) a second planetary section comprising first and second relatively rotatable sun gears, first and second relatively rotatable ring gears, a rotatable carrier, planet gear means rotatably mounted on said rotatable carrier and meshing with said sun and ring gears, first and second brakes for selectively preventing rotation of said first and second ring gears, respectively, and the first of said sun gears being connected to said output member of said first planetary section;

(d) a second drive clutch for selectively connecting the second of said sun gears to said driven power shaft; and (e) a third planetary section comprising an extension of said rotatable carrier of said second planetary section, first and second relatively rotatable sun gears, a rotatable output member connected to said first sun gear, a brake for selectively preventing rotation of said second sun gear, a clutch for selectively locking said second sun gear to said first sun gear, planet gear means rotatably mounted on said rotatable carrier and meshing with said first and second sun gears, a relatively rotatable ring gear meshing with said planet gear means, and a brake for selectively preventing rotation of said ring gear.

2. The transmission of claim 1 wherein said planet gear means of said first planetary section comprises a plurality of cluster gears.

3. The transmission of claim 2 wherein said plurality comprises 3 cluster gears.

4. The transmission of claim 2 wherein each of said cluster gears comprise first and second coaxially connected pinion gears of unequal diameters, said first pinion gear meshing with said sun gear and said second pinion gear meshing with said ring gear.

5. The transmission of claim 4 wherein the diameter of said first pinion gear is larger than the diameter of said second pinion gear.

6. The transmission of claim 1 wherein said rotatable hollow member is connected to said ring gear of said first planetary section and said rotatable carrier of said first planetary section is selectively connectible to said driven power shaft.

7. The transmission of claim 1 wherein said rotatable hollow member is connected to said rotatable carrier of said first planetary section and said ring gear of said first planetary section is selectively connectible to said driven power shaft.

8. The transmission of claim 1 wherein said planet gear means of said second planetary section comprises a plurality of cluster gears.

9. The transmission of claim 8 wherein said plurality comprises three cluster gears.

10. The transmission of claim 8 wherein each of said cluster gears comprises first and second coaxially connected pinion gears of unequal diameters, said first pinion gear meshing with both said first sun gear and said first ring gear, and said second pinion gear meshing with both said second sun gear and said second ring gear.

11. The transmission of claim 1 wherein said planet gear means of said third planetary section comprises a plurality of first and second planet gears.

12. The transmission of claim 11 wherein there are three first planet gears and three second planet gears.

13. The transmission of claim 12 wherein said first and second planet gears are rotatable on different axes, each of said first planet gears meshing with said first sun gear and with one of said second planet gears, and each of said second planet gears meshing with said second sun gear, said ring gear and one of said first planet gears.

* * * * *